US010267617B2

(12) United States Patent
Deck

(10) Patent No.: US 10,267,617 B2
(45) Date of Patent: Apr. 23, 2019

(54) METHOD AND APPARATUS FOR OPTIMIZING THE OPTICAL PERFORMANCE OF INTERFEROMETERS

(71) Applicant: Zygo Corporation, Middlefield, CT (US)

(72) Inventor: Leslie L. Deck, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 367 days.

(21) Appl. No.: 15/383,019

(22) Filed: Dec. 19, 2016

(65) Prior Publication Data

US 2017/0191821 A1    Jul. 6, 2017

Related U.S. Application Data

(60) Provisional application No. 62/273,972, filed on Dec. 31, 2015.

(51) Int. Cl.
*G01B 9/02* (2006.01)
*G01B 11/30* (2006.01)
*G01M 11/02* (2006.01)

(52) U.S. Cl.
CPC .......... *G01B 9/02072* (2013.04); *G01B 11/30* (2013.01); *G01M 11/0292* (2013.01)

(58) Field of Classification Search
CPC .......... G01B 11/30; G01B 11/303; G01B 9/02
See application file for complete search history.

(56) References Cited

U.S. PATENT DOCUMENTS

| 5,398,113 | A | 3/1995 | de Groot |
| 6,490,033 | B1 | 12/2002 | Coult et al. |
| 6,822,745 | B2 * | 11/2004 | De Groot .......... G01B 11/2441 356/485 |
| 6,882,432 | B2 * | 4/2005 | Deck .................. G01B 11/06 356/512 |
| 7,286,208 | B2 | 10/2007 | Smith et al. |

(Continued)

OTHER PUBLICATIONS

International Search Report and Written Opinion of the International Searching Authority for International Application No. PCT/US2016/067453 dated Apr. 5, 2017.

(Continued)

*Primary Examiner* — Yara B Green
(74) *Attorney, Agent, or Firm* — Fish & Richardson P.C.

(57) ABSTRACT

Method include using an apparatus to measure a first surface field, at a first surface of the apparatus, of an artifact having one or more surface features with known topography. The method includes determining a first focus metric at the first surface based on at least a portion of a first surface profile containing the one or more surface features. Methods include digitally transforming, the first surface field into a second surface field at a second surface of the apparatus, deriving, a second surface profile from the second surface field and computing a second focus metric for the second surface profile, and determining, based on two or more focus metric values, an optimum surface for evaluating the instrument transfer function. Method include determining the instrument transfer function of the apparatus based on at least a portion of the surface profile derived from the surface field of the optimum surface.

39 Claims, 12 Drawing Sheets

(56) References Cited

U.S. PATENT DOCUMENTS

2007/0086019 A1 4/2007 De Lega
2008/0266571 A1* 10/2008 Deck .................. G01H 1/06
                                                356/450
2013/0128270 A1 5/2013 Brill et al.

OTHER PUBLICATIONS

Supplementary European Search Report from the European Patent Office for European Patent Application No. EP 16 88 2350 dated Jan. 11, 2019.
International Preliminary Report on Patentability for International Application No. PCT/US2016/067453 dated Jul. 12, 2018 (9 pages).
Taiwan Office Action from the Taiwan Patent Office dated Feb. 6, 2018 (12 pages).
De Groot, P., et al., "Interpreting interferometric height measurements using the instrument transfer function", *Fringe* (2005).
De Groot, P., et al., "The Meaning and Measure of Lateral Resolution for Surface Profiling Interferometers", *Optics and Photonics News*, vol. 23, No. 4, pp. 10-13 (2012).
Colonna de Lega, X., et al., "Lateral resolution and instrument transfer function as criteria for selecting surface metrology instruments", *Imaging and Applied Optics Technical Digest* (2012).
Goodman, J., "Introduction to Fourier Optics", $2^{nd}$ Ed., Roberts and Co. (1996).
Leach, R., "Optical Measurement of Surface Topography", *Springer-Verlag Berlin Heidelberg* (2011).
Schmit, J., et al., "Surface Profilers, Multiple Wavelength, and White Light Interferometry", *Optical Shop Testing*, $3^{rd}$ Ed., *J. Wiley & Sons*, Edited by D. Malacara, pp. 667-755 (2007).
Schreiber, H. et al., "Phase Shifting Interferometry", *Optical Shop Testing*, $3^{rd}$ Ed., *J. Wiley & Sons*, Edited by D. Malacara, pp. 547-666 (2007).
Sziklas, E., et al., "Diffraction Calculations using FFT methods", *Proc. IEEE*, 410-412 (1974).

* cited by examiner

METHOD AND APPARATUS FOR OPTIMIZING THE OPTICAL PERFORMANCE OF INTERFEROMETERS

CROSS-REFERENCE TO RELATED APPLICATION

This application claims the benefit, under 35 U.S.C. § 119(e), of U.S. Provisional Application No. 62/273,972, filed on Dec. 31, 2015, and which is hereby incorporated by reference in its entirety.

BACKGROUND

Optical instruments for the measurement of surface form and texture have a range of specifications and performance criteria for specific applications. One of these is the ability of the instrument to correctly resolve and measure the relative height of neighboring features, or alternatively, to determine structures on the surface of an object in terms of height as a function of spatial frequency. Imaging properties of systems can be characterized using the optical transfer function (OTF) or its magnitude, the modulation transfer function (MTF).

SUMMARY

This disclosure describes highly accurate and repeatable ways to measure the ability of an areal surface topography instrument to resolve and measure surface features of an object. For example, the disclosure describes methods and apparatus that compensate for imaging focus when measuring the instrument transfer function (ITF) of an instrument.

The systems described herein can be used in conjunction with an ITF artifact whose surface contains topographical features of known spatial frequency content. In some embodiments, an instrument under test (IUT) can measure a known surface of an ITF artifact, and an electronic processor connected to the instrument can identify measured features on the ITF artifact, extract the spatial frequency content of the identified features and compare the extracted information to known values to determine the ITF. Accuracy of the ITF evaluation can be optimized by using an electronic processor to transform the measured data in ways that correct for imperfections in the experimental arrangement, including, for example, the imaging focus.

In one aspect, a method of determining an instrument transfer function of an apparatus, the method includes using the apparatus to measure a first surface field, at a first surface of the apparatus, of an artifact having one or more surface features with known topography. The first surface field being a complex electromagnetic field. The method includes deriving, using an electronic processor, a first surface profile from the first surface field, and identifying, using the electronic processor, the one or more surface features from the first surface profile. The method includes determining, using the electronic processor, a first focus metric at the first surface based on at least a portion of the first surface profile containing the surface feature. The method includes digitally transforming, using the electronic processor, the first surface field into a second surface field at a second surface of the apparatus. The second surface field being a complex electromagnetic field. The method includes deriving, using the electronic processor, a second surface profile from the second surface field and computing a second focus metric for the second surface profile, the second focus metric having a value different from the first focus metric. The method includes determining, based on at least the first focus metric and the second focus metric, an optimum surface for evaluating the instrument transfer function, and determining, using the electronic processor, the instrument transfer function of the apparatus based on at least a portion of a surface profile obtained at the optimum surface.

Implementations can include one or more of the following features. The method can further include obtaining a spatial frequency spectrum from a portion of the second surface profile. The portion of the second surface profile can include consecutive pixels of the second surface profile that contain the one or more surface features. The method can include normalizing and differentiating the portion of the second surface profile prior to obtaining the spatial frequency spectrum of the portion. Normalizing the portion of the second surface can include determining, from each portion of the second surface profile, a step height associated with that portion; and dividing the portion by the step height. The first surface profile and the second surface profile can include a topographical representation of the surface of the artifact. The one or more surface features can include a step, the known topography can include a known step height of the step, and the surface profile can include a height map. The second surface can be selected interactively with input from an operator of the apparatus. The second surface can be selected automatically, without input from an operator of the apparatus. Digitally transforming the first surface field to the second surface field can include digitally propagating the first surface field to the second surface field. Digitally propagating the first surface field to the second surface field can include obtaining an angular frequency spectrum from the first surface field, multiplying the angular frequency spectrum with a propagation function that is proportional to a distance between the first surface and the second surface to obtain an updated angular frequency spectrum, and determining the second surface field at the second surface using the updated angular frequency spectrum. A plurality of portions of the second surface profile can be extracted, a spatial frequency spectrum can be determined for each of the plurality of the portions, and spectral components of each of the spatial frequency spectrum can be summed. The second focus metric can maximize a sum of amplitudes of an averaged spatial frequency spectrum derived from the plurality of the portions. The second focus metric can include a Strehl ratio. The method can further include measuring the artifact to obtain the first surface profile. The artifact can include a plurality of unique features to aid in determining the second surface of the apparatus. The plurality of unique features can be disposed at known locations, the plurality of features can act as fiducials. The method can further include determining a lateral resolution of the apparatus based on the fiducials. The method can further include laterally calibrating the apparatus by comparing a sampling distance for the fiducials with a known separation of the fiducials. Identifying the surface feature can include convolving the surface profile with a first function. Sub-pixel resolution of the surface feature can be obtained by convolving the surface profile with the first function. The surface feature can have a known spatial frequency content. Determining the instrument transfer function can include extracting a frequency content of the surface features and dividing a measured amplitude at various frequencies by a known amplitude at those frequencies. Phase shifting interferometry can be used to measure the surface profile of the artifact. The one or more surface features can be disposed on a substrate that is nominally a sphere. The one or more surface features can be disposed on a substrate that is nominally a flat. A height of the one or more surface features can be less than 5% of a wavelength of light used to measure the surface profile. The one or more surface features can vary in distance along an illumination propagation direction of the apparatus. The surface feature can vary in reflectivity perpendicular to an illumination propagation direction of the apparatus.

In another aspect, a system can include an apparatus configured to measure a first surface profile of an artifact placed at a first surface of the apparatus, the artifact can include a surface feature; and a processor configured to determine an instrument transfer function of the apparatus by receiving a first surface field of the artifact measured by the apparatus and deriving a first surface profile from the first surface field. The processor can be configured to identify the surface feature from the first surface profile. The processor can be configured to determine a first focus metric at the first surface based on at least a portion of the first surface profile containing the surface feature. The processor can be configured to digitally transform the first surface field into a second surface field at a second surface of the apparatus. The processor can be configured to derive a second surface profile from the second surface field and compute a second focus metric for the second surface profile, the second focus metric having a different value from the first focus metric. The processor can be configured to determine, based on at least the first focus metric and the second focus metric, an optimum surface for evaluating the instrument transfer function; and the processor can be configured to determine the instrument transfer function of the apparatus based on at least a portion of a surface profile obtained at the optimum surface.

Implementations can include one or more of the following features. The system can further include the artifact.

In another aspect, an artifact includes surface step features having different step heights; and one or more regions containing surface features having known spatial frequency content. At least some of the step features can include sharp steps that are greater than 5 nm and less than or equal to 5% of a wavelength of light used to characterize an instrument.

Implementations can include one or more of the following features. The step heights of the step features can be less than 5% of a wavelength used to probe the artifact for characterizing the instrument. The artifact can further include a number of unique features situated at known locations. The unique features can be configured to act as fiducials. The fiducials can be configured to determine a lateral resolution of the instrument. The artifact can further include a focusing features configured to precisely focus the instrument. The artifact can be spherical. The artifact can be planar. The surface step features can vary in distance along an illumination propagation direction.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
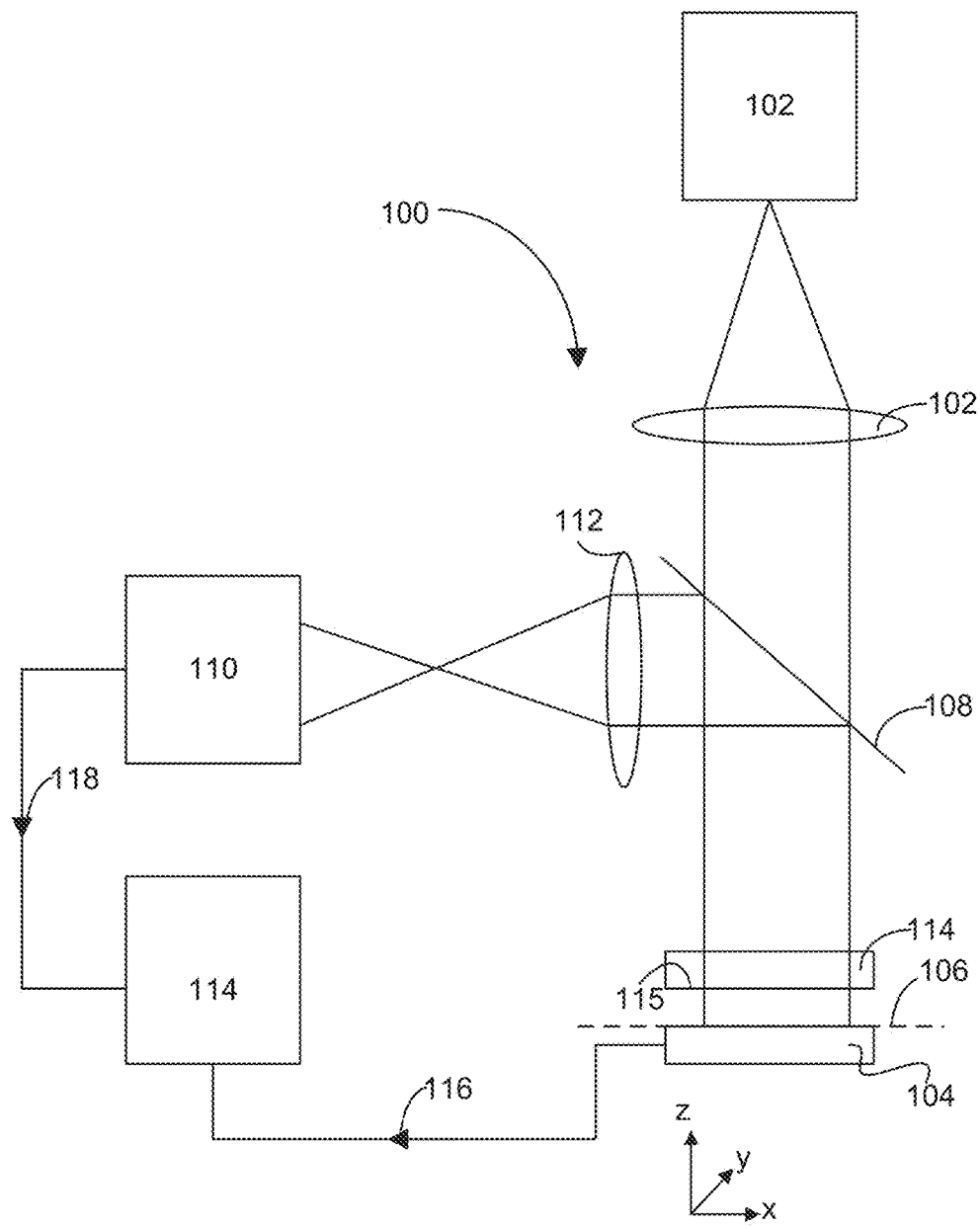
FIG. 1 is a schematic diagram showing a system whose instrument transfer function (ITF) is determined.

The instrument transfer function (ITF) can describe the response of an areal surface height measuring instrument to surface features, as characterized by their spatial frequency response. Areal surface topography measurement systems include laser Fizeau interferometers, interference microscopes, confocal microscopes, focus variation instruments, and other optical systems. The ITF describes a system's response in terms of the frequency content of an input disturbance. ITF is generally applied to linear systems, which are systems for which the final system response is simply the sum of the separate responses from each of the input frequencies that make up the input disturbance. The ITF of an imaging interferometer is its imaging optical transfer function (OTF) in the limit of small surface deviations ($<<\lambda/4$), where $\lambda$ is the wavelength of the light used in the imaging interferometer.

The measurement of ITF, or more generally, the optical performance of a system can be important in selecting instrumentation, determining capability, and interpreting results. A specified ITF normally assumes several idealized measurement conditions. For example, one assumption is that the instrument is perfectly focused onto the object to be measured, so as to optimize the optical resolving power of the instrument. The ITF is intended as a quantitative measure of instrument fidelity, providing performance information over a range of lateral resolutions.

In some embodiments, the instrument transfer function of interferometric optical profilers is determined from the measurement of a set of known surface features incorporated onto a surface of a special test optic (e.g., an artifact). The arrangement of features on the surface of the artifact influences its surface profile. The surface profile provides information about the three-dimensional shape of the features on the surface. The term surface profile is used interchangeably with the term surface topography in this disclosure. The ITF of an interferometric profiler can be determined by measuring an object (e.g., the artifact) whose surface has features containing known (spatial) frequency content, and extracting the frequency content of these measured surface features. Thereafter, the measured amplitude found at various frequencies can be divided by known amplitudes at those frequencies.

The artifact can contain surface features that are readily manufacturable and measurable. Such features ideally encompass most (e.g., all) the spatial frequencies of interest. A sharp step is an example of such a feature. Sharp steps can be routinely produced with standard lithographic methods and a Fourier transform (which is broadly defined herein as including, for example, discrete Fourier transform (DFT), fast Fourier transform (FFT), and other frequency transforms that convert spatially periodic features into spatial frequencies and vice-versa) of a perfect step contains an infinite number of spatial frequencies. Step heights of the artifact can be small compared to $\lambda/4$, where $\lambda$ is the wavelength of light used to probe the artifact, in order to stay within the linear systems regime.

The accuracy of the ITF measurement can be influenced by factors that disturb either the measured or true surface step profile. Disturbances to the measured step profile can arise from environmental effects such as vibrations and air turbulence during measurement. Factors that disturb the true surface step profile can include uncertainty in the known frequency content of the artifact due to, for example, unknown variations in the step edge, or surface contamination, defects or structure. There may also be defocus errors due to an imperfect focus selected by an operator of the instrument. The accuracy of the ITF measurement can also be influenced by optical limits imposed by internal instrument apertures and/or components. This last type of disturbances is what ITF ideally measures (i.e., disturbances caused by instrument optical limits).

Environmental effects can be minimized with isolation and shielding and by reducing the interferometer cavity length as much as possible. Averaging can also be employed if the errors from the disturbances are sufficiently random. Uncertainty in the artifact frequency content is minimized by artifact construction and by keeping the artifact clean. Imperfect operator defocus can be a significant source of ITF measurement variability in commercial profilers. To measure an instrument's or a tool's response to a particular spatial frequency, the artifact should contain measurable power in that spatial frequency. In general, the sharper the step edge transition, the higher the spatial frequency content of that edge. Thus, when constructing the artifact, it is usually advantageous to maximize the edge sharpness so that the broadest range of spatial frequencies can be measured with adequate signal to noise ratio (S/N). In general, the edge quality should also not be dependent on the spatial position so that the ITF can be reliably and accurately measured over the field covered by the artifact.

The methods and systems described herein can minimize this error source and optimize the ITF measurement in both quality and repeatability to create a reliable metric for evaluating instrument response.

FIG. 1 shows an embodiment that includes a Fizeau interferometer 100. The ITF of other optical systems can also be measured using the methods and systems disclosed herein. The Fizeau interferometer 100 includes a light source 102. The light source 102 can be a laser source, such as a helium-neon (HeNe) laser emitting light having a wavelength $\lambda$ of 633 nm. An optical element 102 (only a single element is illustrated in FIG. 1), schematically depicted as a lens can be used to collimate light emitted from the source 102. A portion of the light is transmitted through a beamsplitter 108 before it strikes a partially-transparent reference optical element 114 having a partially-transparent back reference surface 115. The partially-transparent reference surface 115 divides light into a reference beam and a measurement beam. The measurement beam is transmitted across the back reference surface 115 and propagates to an object of interest, which can be a test artifact 104, the front surface of which is located in a plane 106. The front surface of the artifact 104 contains one or more surface features (not illustrated in FIG. 1) having known characteristics. These characteristics can include a height of a feature, a linewidth of the feature, and/or a spacing between features. Even though the artifact 104 is depicted as a planar element in FIG. 1, artifact 104 can have other forms (e.g., spherical, aspherical, curved).

The measurement beam and reference beam are reflected by the beamsplitter 108 and imaged by an optical element 112 (shown as a single element in FIG. 1) onto the detector 110. Light reflected from the front surface of the artifact 104 is combined with the reference light reflected off the back surface 115 of the reference optical element 114 at a detector 110 which images the resulting interference pattern electronically. The detector 110 can be a two-dimensional detector like a CCD camera having a two-dimensional array of pixels. Carrier fringe interferometry is one type of instrument the methods and apparatus described herein can be used. For example, in carrier fringe interferometry, the reflected measurement and reference beams are at an angle such that there are dense interference fringes at the detector 110. The number of fringes across the field is termed the carrier frequency, which can be very high—on the order of hundreds of fringes over the field of view (FOV) of the instrument. The FOV is the spatial extent observable by the instrument and can depend on the optical configuration. The FOV can usually be modified by, for example, adjusting the instrument "zoom". In the carrier fringe method, there is spatial encoding of phase information. Increasing zoom reduces the observable spatial extent but increases the sampling density—usually to resolve finer detail.

Other interferometer instruments, like systems which use Phase-Shifting techniques can be used. In the Phase-Shifting techniques, phase information is temporally changed to generate a sequence of interferogram frames. The methods and apparatus described herein can be used in any interferometer that produces a topographical representation of the artifact surface.

Measurement data 118 recorded by the detector 110 is sent to an electronic processor 114. The measurement data 118 sent can include a detected interference pattern that is an electronic image-plane hologram of the object (e.g., artifact 104) from which a digital image of the reflected object wavefront can be computed using Fourier processing. Fourier processing broadly includes DFT, FFT, and other frequency transforms that convert spatially periodic features into spatial frequencies and vice-versa. The electronic processor 114 contains software that allows processing of these holograms to directly measure the phase of the wavefront, and to generate an electronic 3D image of the object surface. The electronic processor 114 can also receive information 116 from a positioning device that reports at least a z-position of the test artifact 104.

Figure 2:
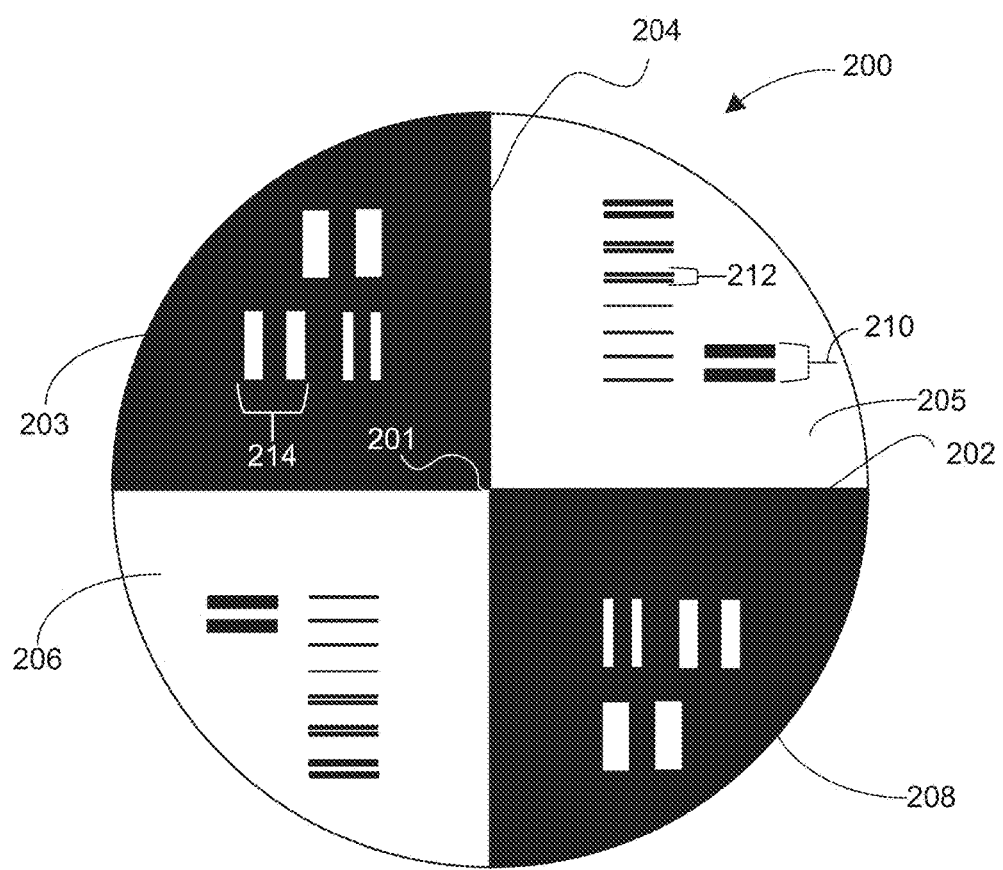
FIG. 2 is a schematic diagram showing an exemplary artifact.

Though many types of surface features can be used for ITF evaluation, FIG. 2 shows an exemplary artifact 200 for determining the ITF of an interferometer when measuring flat surfaces. The surface contains features that can be used advantageously for a variety of purposes related to the ITF measurement. These features can be phase-like (i.e. vary in distance along the illumination propagation direction, or the z-direction shown in FIG. 1) or intensity-like (i.e. vary in reflectivity perpendicular to the illumination propagation direction). Phase features can have topographical height difference h, small compared to the nominal wavelength used in the IUT (i.e., h<<λ/4) Phase features can be used for the measurement of the ITF while either phase or intensity features can be used for other measurements. The artifact can have a variety of phase features with different heights so as to expand the range of wavelengths for which the artifact could be used. The artifact shown in FIG. 2 is just one example, many other surfaces with different features can be considered.

The main phase feature of artifact 200 used for ITF measurement is a vertical step 204 and a horizontal step 202 emanating from a center 201, which producing four quadrants 203, 205, 206 and 208 situated in two different surface planes (quadrants 205 and 206 in one surface plane, and quadrants 203 and 208 in the second surface plane) separated by the steps 202 and 204. The main cross pattern can be the step edge used to measure the ITF. When the two surface planes are perfectly flat and the edges of the features are perfectly sharp, the frequency content of the features would be perfectly known. However practical manufacturing considerations allow for small deviations from these ideals. The surface features shown in grey in FIG. 2 are higher than those in white. The step edge bounding adjacent quadrants can be sharp compared to a sampling period (i.e., the lateral sampling width) of the IUT. Ideally, the distance between a point having 10% of the height of the step to a point having 90% of the height of the step (i.e., the 10%-90% edge transition) is less than a tenth of the IUT sampling period. As an example, the artifact 200 shown in FIG. 2 has a 10%-90% edge transition specification of less than 1 micron.

Surfaces that are smooth and flat can limit frequency contamination. For example, form deviations produce contamination at the low frequency end while scratches, pits and dust can produce contamination at the mid to high frequency end. "High" and "low" frequencies are instrument and user dependent. In the context of an instrument having a 100 mm aperture ("100 mm aperture tool"), the "low" end might be described by frequencies of 10 cycles per aperture or less, "high" might be 100 cycles per aperture or greater and "mid" the region between.

As an example, the artifact 200 shown in FIG. 2 has a surface form specification of λ/40 PV across the center 90% of the aperture (i.e., the diameter of the artifact). In other words, the surface form deviates, peak to valley, by less than one-fortieth the wavelength of the light across the artifact. In general, the surface form can capture lower order variations of the shape of the artifact across its surface. The artifact 200 has a surface quality specification of 20-10 with a surface rms of <1 nm over any 0.5 mm field measured at 10 micron resolution.

The use of a step can have other practical benefits besides manufacturability. Consider an infinitely sharp step of height h described by the Heaviside function H(x)

$$H(x) = \begin{cases} 0, & x < 0 \\ 1/2, & x = 0 \\ 1, & x > 0 \end{cases} \quad (1)$$

The derivative of the Heaviside function is the Dirac delta function:

$$\frac{d}{dx}H(x) = \delta(x) \quad (2)$$

The Fourier transform of the derivative of the step is simply $$\int_{-\infty}^{\infty} \frac{d(hH(x))}{dx} e^{-ikx} dx = h \int_{-\infty}^{\infty} \delta(0) e^{-ikx} dx = h \quad (3)$$

The ITF can be efficiently calculated the from the step derivative based on this property. In particular, the derivative of the step can minimize surface tilt influences and the DC term can be handled effectively by simply dividing the Fourier transform of the derivative of the step by either the known or measured step height. Poor handling of the DC term can shift the normalized ITF curve up or down (i.e., increasing the values, or lowering the values), effectively changing the ITF values in each bin (i.e., for each spatial frequency). The ITF typically falls from a value of 1 at DC to zero at Nyquist. Sometimes the ITF can exceed 1, and can indicate an instrument deficiency or the presence of aliased power.

Other features can be placed on the surface to aid in orientation identification, focus or to provide fiducials to measure the lateral resolution (i.e., lateral calibration) of the IUT. These can be either phase or intensity features, and are generally referred to as "focus features". The artifact 200 contains phase focus features 210, 212, and 214. These features are pairs of lines of varying thickness in the four quadrants. The positions of the line pairs are precisely known and thus provide fiducials from which lateral sampling (e.g., distance/pixel of the detector 110) can be deduced. Additionally, sharpness of the line pair and the measured depth provide qualitative and quantitative information of both the focus and instrument response at a number of specific spatial frequencies. The pairs of lines can provide simple verifications of ITF at specific spatial frequencies.

The artifact 200 is used as a representative example to illustrate specific details of the ITF measurement process. Most of the details are not specific to this artifact though the procedure detailed below assumes that the main ITF feature is a step edge.

Figure 3:
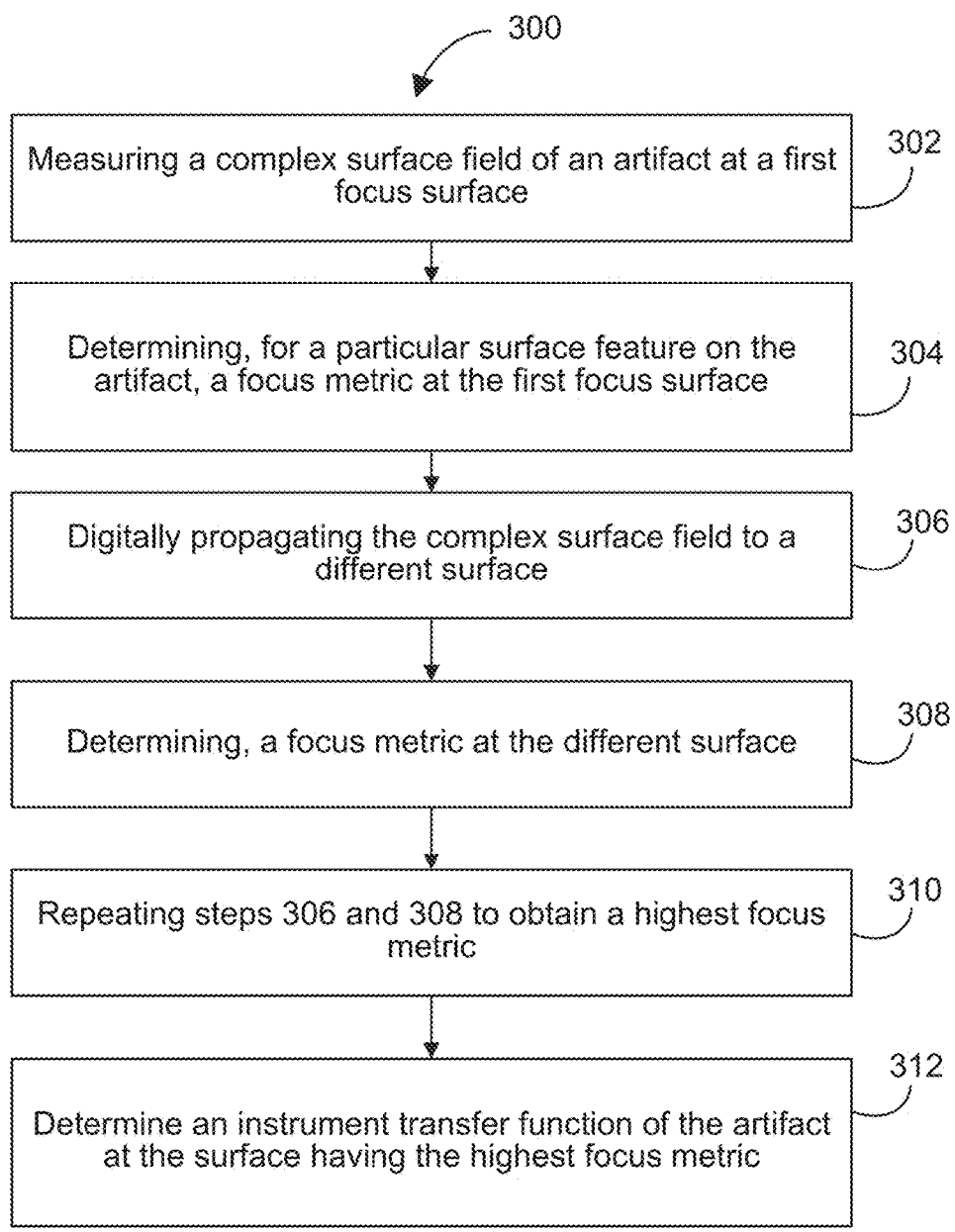
FIG. 3 is a flow chart of a method for determining an ITF.

A method 300 illustrated as a flowchart in FIG. 3 briefly describes how the ITF 15 determined. The method 300 starts with measuring a surface of the artifact using an instrument under test (IUT) in step 302. The measurement method utilized can be any number of interferometric methods well-known in the art, such as Phase Shifting Interferometry. The Fizeau interferometer 100 shown in FIG. 1 can be the IUT. The surface of the artifact 104 is positioned at a surface (a plane in this case) 106. The result of the measurement is a complex surface field (i.e., a complex electromagnetic field) from which a "height map"—a topographical representation of the surface in physical units can be derived.

As an example, in phase shifting interferometry (PSI), the complex surface field can be determined from a set of phase shifted frames acquired during a PSI acquisition. The complex coefficients for an N-frame PSI algorithm can be $C_j$ where j=0 ... N−1. The N measured intensities for pixel x be represented by $I_{x,j}$. The "complex surface field" $U_x$ is then represented by $U_x = \Sigma_j C_j I_{x,j} = A_x \exp[i\varphi_x]$ where the phase $\varphi_x$ for pixel x is determined via $$\varphi_x = \arg(U_x) = \mathrm{atan}\left(\frac{\mathrm{Im}[U_x]}{\mathrm{Re}[U_x]}\right)$$

and the amplitude $A_x$ with $$A_x = |U_x| = \sqrt{(Im[U_x])^2 + (Re[U_x])^2}$$

The relative intensity is $|U_x|^2 = |A_x|^2$. As detailed below, it is $U_x$ which is propagated to a new Z' plane, becoming $U'_x$, from which a new phase map can be extracted with $\varphi'_x = \arg(U'_x)$. The phase map (in radians) can be converted into a height map (in nanometers) by multiplying the phase with the wavelength of light used in the measurement.

Figure 4:
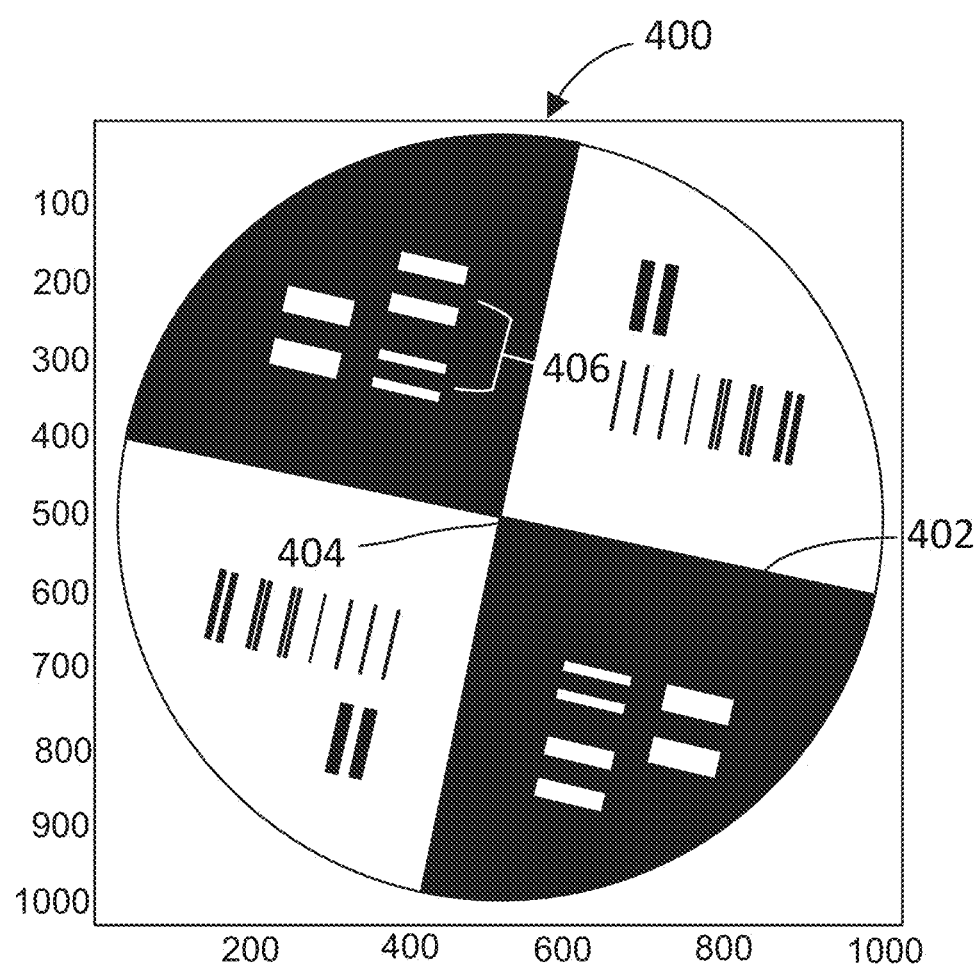
FIG. 4 is an exemplary height map.

The height map is then analyzed to extract the ITF. FIG. 4 shows a gray-scale image of the height map produced by measuring a flat artifact with a surface similar to artifact 200 shown in FIG. 2, using a 100 mm aperture HeNe laser interferometer. The main step edges 402 and 404, and focus features, such as line pairs 406 are clearly visible. The height of steps 402 and 404 were nominally 26 nm and the gray-scale excursion is about 50 nm PV.

The artifact surface measurements generally conform to best principles and practices used for precision interferometric measurements. Optimizing focus, minimizing departure, maximizing contrast and detector dynamic range, etc., are examples of such best principles and practices. In this context, departure can represent the deviation of the surface from a plane perpendicular to the optical axis. For example if the surface has a form deviation (deviation from a flat if measuring flats or from a sphere if measuring spheres), or if the part is imperfectly aligned to the optical wavefront (which can create tilt fringes).

Effects that can adversely influence the height map can be minimized. These can include environmental disturbances such as vibration and air turbulence. Additionally the step edge should be nominally aligned to the imager row and column axes, though this need not be very precise, since deviations from perfect alignment can be handled by the electronic processor during processing. The influence of back surface reflections from the artifact can also be minimized by, for example, introducing a wedge in the artifact and/or an anti-reflection coating on the back surface of the artifact.

After the height map is derived from the data measured at step 302, specific surface features in the height map are then identified. For the artifact 200 shown in FIG. 2, these features can include the main step edges 202 and 204 which are used in the ITF evaluation, or features such as 210, 212 and 204, which are used for focus determination or features to determine the lateral resolution of the instrument.

Since the surface topography of the physical artifact 200 is initially known (i.e., the artifact 200 itself has a well-defined surface topography that is known a priori), many of these features, as measured by the interferometer, can be identified though a mathematical convolution of the experimentally derived height map with a function that imitates the desired feature. The desired feature can be the main step edges 202 and 204. In other words, even though the surface topography of the artifact 200 is known, the actual position of this artifact within the interferometer (e.g., position within the interferometer' field of view) and the data recorded by pixels on the detector that correspond to the desired features are determined using mathematical convolutions of the height map (to identify which pixels of the measured data contain the desired features). For example, a convolution of a theoretical vertical step with the height map can easily identify the main vertical step edge as well as vertical edges of the focus features. The same is true for the horizontal step. For example, as detailed below, the convolution involves convolving a convolution kernel (e.g., a 9×9 matrix) with the height map. The convolution kernel is chosen to yield specific features (e.g., corners or edges).

Figure 5A:
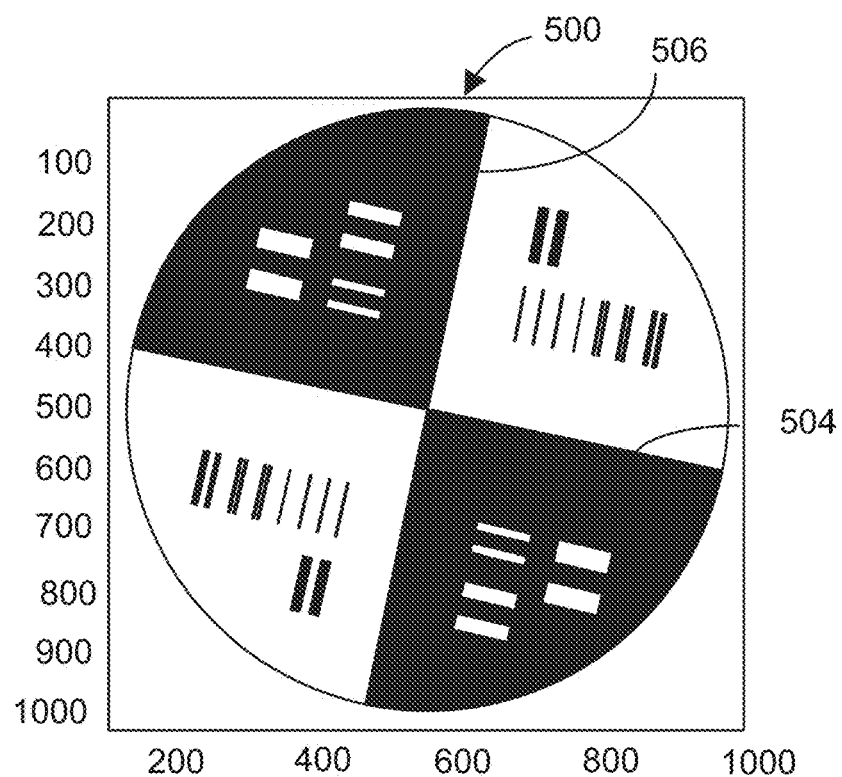
FIG. 5A shows locations of edge steps.
Figure 5B:
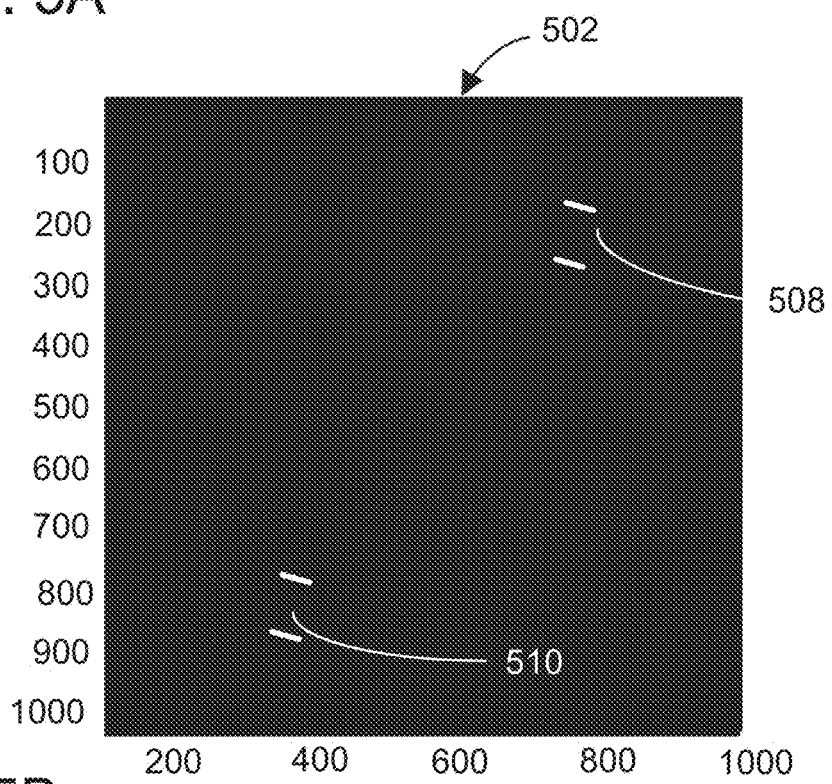
FIG. 5B shows locations of two corner features.
Figure 5C:
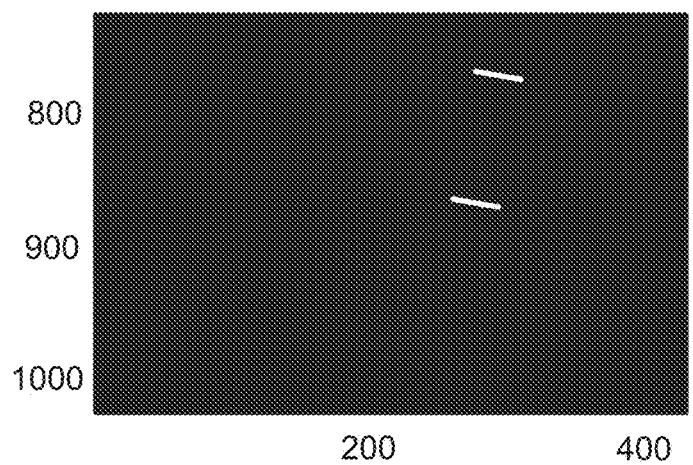
FIG. 5C shows a close-up of the corner positions found in one of the two corner features of FIG. 5B.

The convolution method can be aided by nominally aligning the step edge(s) parallel to the imager rows and column axes. The convolution function can be a one-dimensional convolution function operating on the height map along a single dimension, or the convolution function can be a two-dimensional surface. Alternatively, the convolution function can replicate the whole artifact shape. Such a convolution function can provide a best fit to the height map, through which surface features can be identified. Though a convolution can be very effective, other methods, such as simply placing a reference line on the height map until the reference line intersect a feature, can be used to identify various features in the height map. FIG. 5A and FIG. 5B show the results of applying three 9×9 convolution kernels (i.e. two-dimensional functions) on the height map 400 shown in FIG. 4. FIG. 5C zooms into the lower left corner of FIG. 5B, magnifying the feature marks 510.

In image processing, a kernel (or convolution matrix) is a small matrix useful for blurring, sharpening, embossing, edge-detection, and more. This is accomplished by means of convolution between a kernel and an image. The kernel can be a square matrix used for image convolution. FIG. 5A shows the result of using a convolution kernel for nominally horizontal edges to produce a feature line 504 of the main step edge, and a convolution kernel for nominally vertical edges to produce feature line 506 of the main step edge. FIG. 5B shows the result of using a convolution kernel for corners, which identifies a number of corners of the focus features in the upper right and lower left quadrants. Only feature marks 508 and 510 of the corners of focus features are shown in FIG. 5B, all other corner feature marks have been suppressed.

Convolution procedures used in feature identification can also be used to laterally calibrate the instrument by determining the physical sampling period. In lateral calibration, sampling distances from a variety of main step and/or focus feature edges or corners are determined and compared with their known separation to determine the sampling in physical units (pixels/mm, for example). For example, consider a simplified one-dimensional illustration, in which a first corner feature is located at pixel 4, and a second corner feature is located at pixel 39. The sampling distance in this case would be 35 pixels. Assuming that it is known a priori that the artifact has two corners that are separated by 70 mm. In this case, the sampling in physical units would be 0.5 pixel/mm. Turning to the artifact 200, from the known distances to focus feature corners 508 and 510 shown in FIG. 5B, and the corresponding measured distance in pixels, the lateral resolution was determined to be 101.6 microns/pixel. The convolution method can also be effective here for providing sub-pixel resolution of specific features. The convolution method allows analog fitting of the data within a pixel to determine peaks of greatest agreement at a sub-pixel level.

Once the features (in the case of the artifact 200, its step edges 202 and/or 204) are identified using the convolution methods outlined above, fixed length profiles perpendicular to the edge, called traces, are extracted. For example, assuming that the convolution method identifies the main step as being located between pixels 40-41 (sub-pixel accuracy is assumed), then a 64 pixel length trace would be extracted using pixels 8 through 71 (inclusive) or 9 through 72. Note that the trace length need not be a power of 2. For a horizontal step, obtaining a trace can involve extracting consecutive column (row) pixels that cross the step edge. For a vertical step, the trace can involve extracting consecutive rows of pixels that cross the vertical step. Instead of taking consecutive pixels, the trace can also extract every other pixel, and/or extract the average of several pixels.

Figure 6:
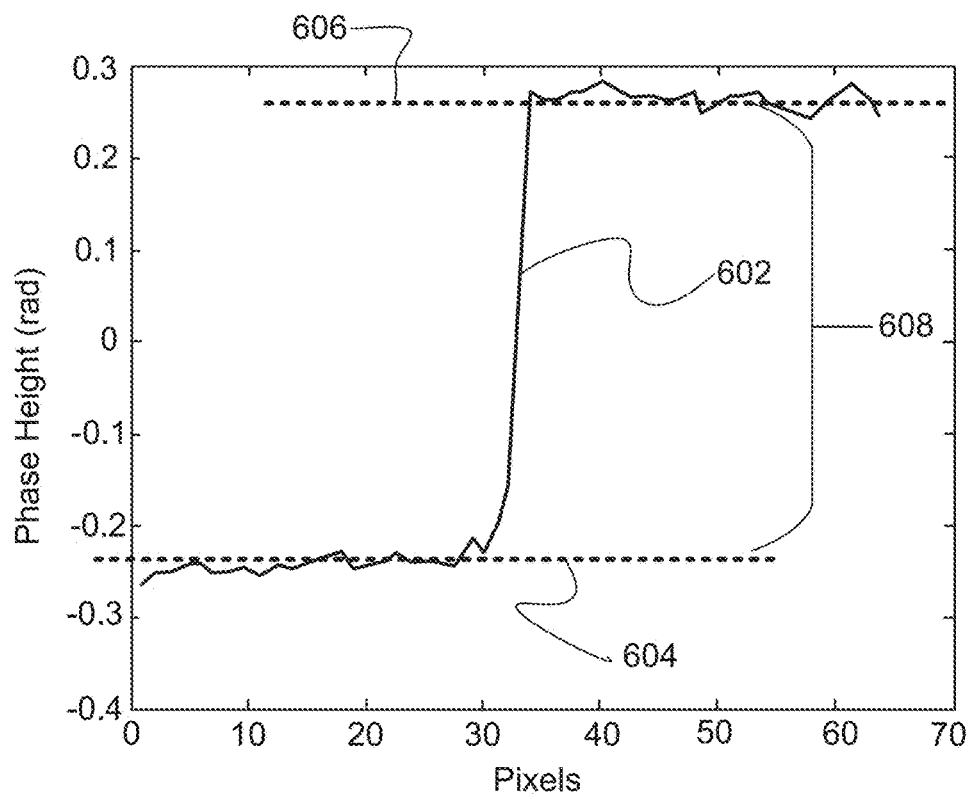
FIG. 6 is an exemplary data trace.

FIG. 6 shows a phase profile from a typical trace 602, selected from a set of over 1800 high quality traces that include both vertical and horizontal traces straddling the main step edge 402 and 404. A trace length of the trace 602 was selected to be 64 pixels (a power of 2) to maximize both processing speed of the Fourier transforms used in the focus refinement and ITF calculations, and to provide the desired spatial frequency resolution. Small variations in the trace are due mainly to surface imperfections. The nominal phase step of 0.52 radians corresponds to 26.2 nm after converting to physical units using the known HeNe wavelength (633 nm). 0.52 radians of 633 nm is 52.4 nm, however, light double-passes the gap between the back reference surface 115 and the front surface of the artifact 104, so a factor of 2 is used to determine the actual height of surface features.

Here, the trace 602 is represented by the set of pixels that makes up the trace, not necessarily the height values of those pixels. This distinction is made because the heights associated with individual pixels may change during a focus refinement procedure. The traces are selected so that the edge is nominally at the center of the trace. Tests for trace quality may be made to discard traces that contain obvious problems, such as distortions from scratches/pits or dust particles. The trace length chosen depends on a number of factors: the desired frequency sampling resolution, the nominal surface form deviation, the proximity of other features, the amount of residual defocus, etc.

Figure 7A:
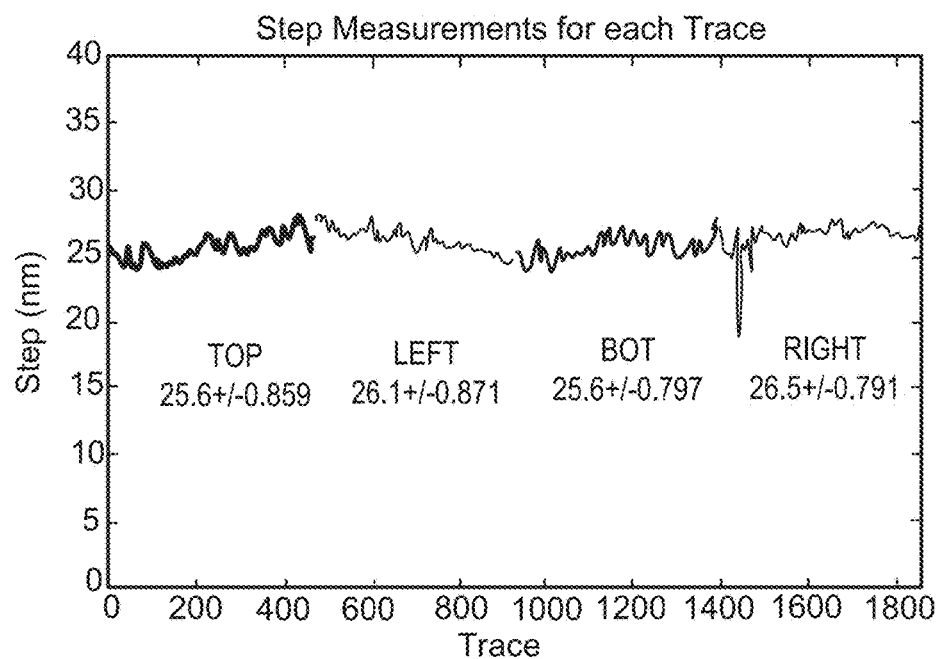
FIG. 7A is a plot of step measurements from more than 1800 traces.
Figure 7B:
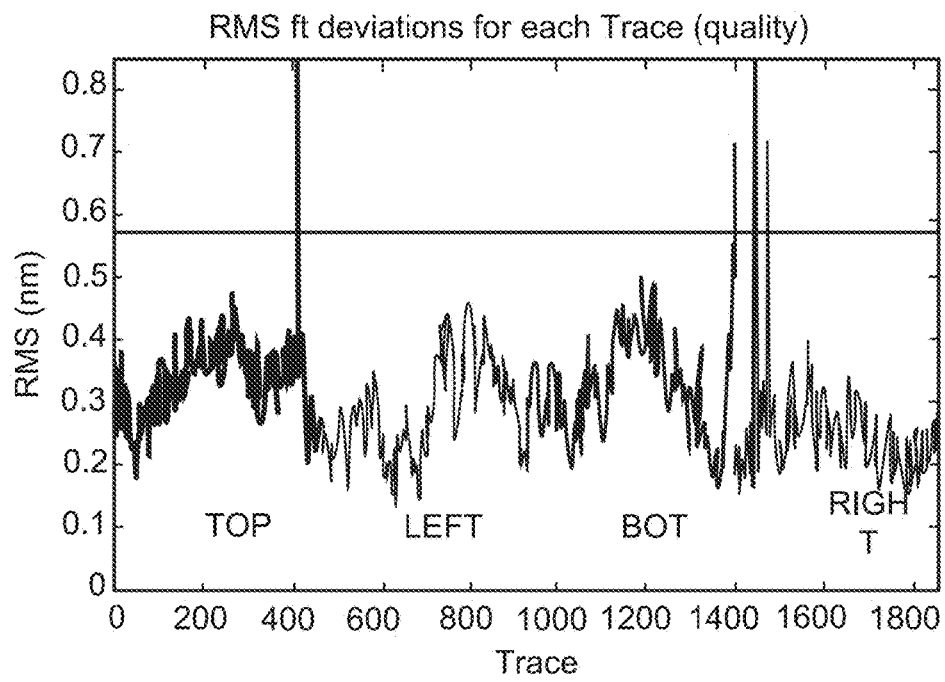
FIG. 7B is a plot of a root mean square (rms) deviation for each of the more than 1800 traces.

FIG. 7A shows the measured step heights derived from the set of over 1800 traces. The step height is derived from a fit of two parallel lines 604 and 606, as shown in FIG. 6, which are offset by the step height 608. The first quarter of traces in FIG. 7A is obtained from the top step edge of the artifact 200. The second quarter of traces is obtained from the left step edge, and the third quarter of traces is obtained from the bottom step edge. The last quarter of traces is obtained from the right step edge. FIG. 7B shows a plot of the root-mean square (RMS) deviation for each of the more than 1800 traces, and is used to assure trace quality. An additional check on the derived step height was performed in which only traces within 4 nm of the nominal step height were passed. The set of traces which passed all quality checks were used for both focus and ITF determination.

In most surface profiling interferometers, focus is adjusted manually by the operator, who adjusts focus by maximizing the visual "sharpness" of features in the interferometer field of view. This can be difficult to do optimally due to many factors, such as inadequacy of the focusing hardware, imager pixilation, fringe interference or simply operator error. Residual defocus is often the largest contributor to poor ITF measurement performance and the cause of variability.

To remove operator-induced residual defocus, the focus is refined through a mathematical procedure that digitally transforms or propagates (e.g., by Fresnel propagation) the measured complex surface field to the best focus position determined digitally.

Returning to FIG. 3, the focus optimization process begins at step 304 with the determination, for a particular surface feature on the artifact, a focus metric at the first focus surface where the artifact is located. A focus metric is any figure of merit that can be used to characterize how well focused a particular feature is. An example of a focus metric is the Strehl ratio, which is a measure of the quality of optical image formation. Step 306, involves digitally propagating the complex surface field measured at the first focus surface to a new surface. A new focus metric is then determined at the new surface in step 308. The surface field is then propagated to two or more positions. Finally, the complex surface field is propagated to the location where the optimal focus metric is obtained. Depending on the metric, the optimal value may be a maximum or a minimum. This is the surface of optimal focus. The ITF is then determined at the surface of optimal focus.

Focus Refinement

An exemplary focus refinement can include Fresnel propagating along the z direction (as shown in FIG. 1) of the measured surface field to a new focus plane. According to light propagation in the Fresnel approximation for nominally plane wavefronts, propagating a complex surface field having a complex wavefront $U(x,y,z_1)$ at $z_1$ to $z_2$ can involve first obtaining an angular spectrum $$A\left(\frac{\alpha}{\lambda}, \frac{\beta}{\lambda}, z_1\right)$$

from the complex wavefront $U(x, y, z_1)$, where $\alpha$, $\beta$ are direction cosines along x and y axes. The angular spectrum can be obtained, for example, by Fourier transform, such as DFT, FFT, or wavelet transform. This complex surface field $U(x, y, z_1)$ is equivalent to $U_x$, discussed earlier in the context of PSI.

Next, the angular spectrum $$A\left(\frac{\alpha}{\lambda}, \frac{\beta}{\lambda}, z_1\right)$$

is multiplied by a function (e.g., the propagation kernel) having the mathematical form $$\exp\left(i\frac{2\pi}{\lambda}(z_2 - z_1)\sqrt{1 - (\alpha^2 + \beta^2)}\right)$$

where $(z_2-z_1)$ represents the distance between the initial and propagated wavefront planes. Subsequently, evanescent frequencies are removed by setting to zero those frequencies for which $\alpha^2+\beta^2>1$. Thereafter, an inverse Fourier transform is performed to obtain the complex wavefront at the new plane $z_2$:

$$U(x, y, z_2) = FT^{-1}\left\{\exp\left(i\frac{2\pi}{\lambda}(z_2 - z_1)\sqrt{1 - (\alpha^2 + \beta^2)}\right) U(x, y, z_1)\right\}.$$

For spherical wavefronts (e.g., when a spherical artifact is used), the mathematical formulation above is modified using coordinate transformation to account for the change in magnification during propagation. For example, all z values can be measured relative to the beam waist position. For the propagation of a spherical wavefront from $z_1$ to $z_2$, the three coordinates transform as $$x'_{1,2} = \frac{x_{1,2}}{z_{1,2}}, \ y'_{1,2} = \frac{y_{1,2}}{z_{1,2}} \text{ and } z'_2 - z'_1 = \frac{z_2 - z_1}{z_2 z_1}.$$

The propagation of a spherical wave proceeds as outlined above for a planar wavefront, once the coordinate transformations are performed (i.e., obtaining an angular spectrum of the complex surface field, multiplying with the propagation kernel, removing evanescent frequencies, and inverse transforming back into the complex surface field at new surface). The digital transformation/propagation method outlined above eliminates the need to vary the physical position of the artifact through mechanical means when searching through various focus planes.

Instead or in addition to the focus refining steps outlined above, the focus plane or surface can be selected interactively with input from the instrument operator. In some embodiments, the focus plane or surface is selected automatically, without intervention by the instrument operator. In some embodiments, the focus plane or surface is selected using a focus metric, for example, as outlined above. The focus metric can be used to define a best focus plane that maximizes the sum of averaged amplitudes from spatial frequency spectra derived from the set of traces. Such a focus metric is equivalent to the Strehl ratio.

Determining the ITF and/or a Focus Metric

Figure 8A:
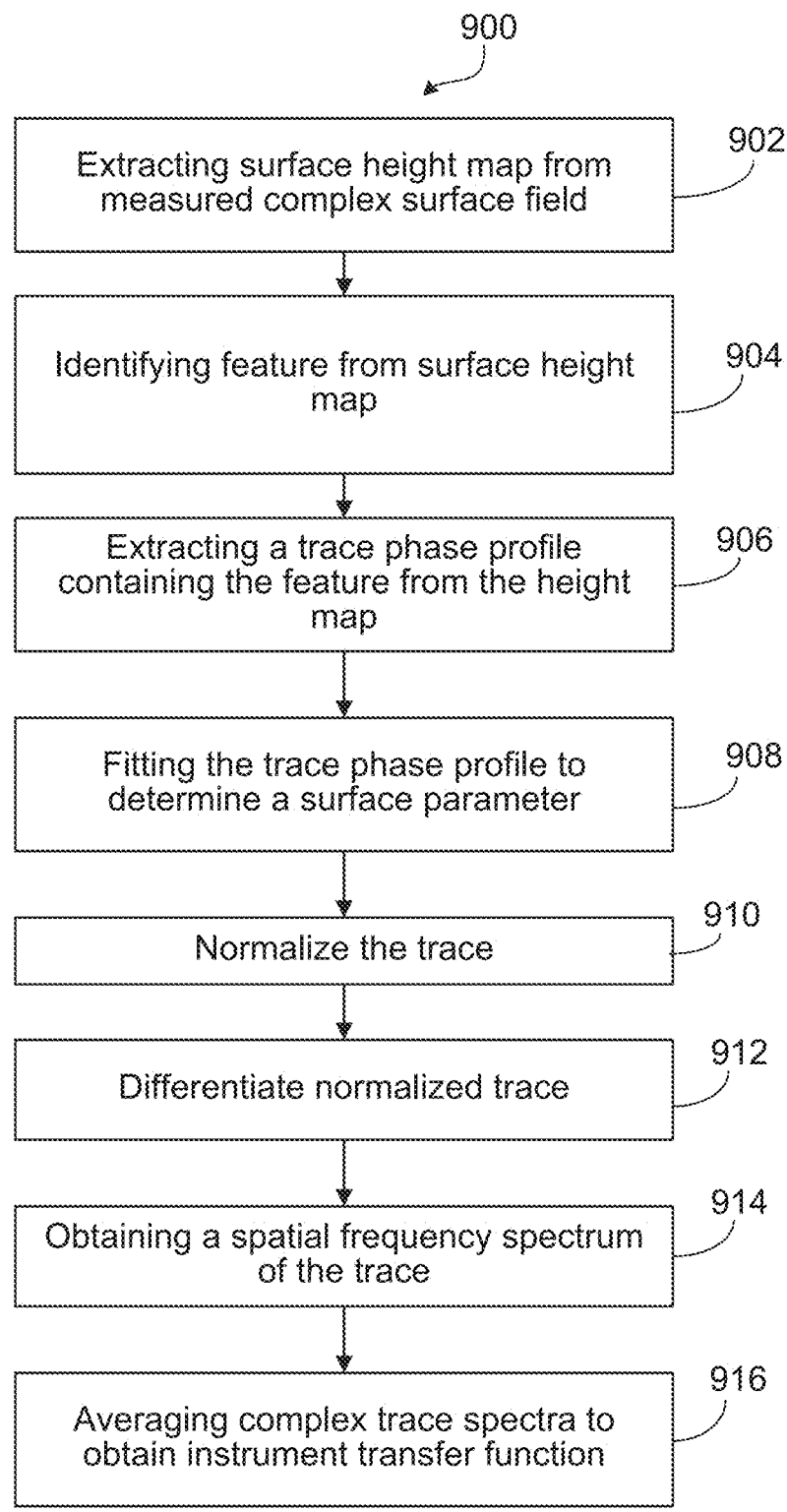
FIG. 8A is a flow chart of a method for determining an ITF.

FIG. 8A shows a method 900 for determining the ITF. For each newly calculated/propagated complex surface field $U(x, y, z_2)$ at the new surface $z_2$, a new height map can be extracted in a step 902, and selected surface features identified in step 904. The complex surface field $U(x, y, z_2)$ is equivalent to $U'_x$, discussed earlier in the context of PSI.

New trace phase profiles can be obtained from the new height map in a step 906. For each new trace, a trace phase profile is extracted. Assuming the feature is a step edge, the phase profile is fit to a step (as shown in FIG. 6) to determine the step height and phase tilt in a step 908. Since a lateral shift of the edge is equivalent to phase tilt in the Fourier domain, removing the phase tilt eliminates edge misalignment in each trace. The trace is then normalized by removing the phase tilt and dividing by the fit determined step height in a step 910.

Thereafter, the normalized trace is differentiated in a step 912 and a Fourier window can be applied to minimize error due to variation in the DC component. The trace can be circular shifted about its center. Circular shifting involves connecting the right most data point of the trace with the left most data point of the trace (to form a "ring") and shifting the "ring" of data to re-position/lateral shift the step. Lateral shifting of the edge is equivalent to a phase tilt in the spatial frequency domain.

A spatial frequency spectrum is then extracted from the trace in a step 914, for example, by Fourier transform. The phase and amplitude at each frequency component is then calculated. The phase slope is calculated by weighting the phase at a particular frequency with the spectral power at that frequency so that less weight is given to phase components that may be poorly determined. The phase slope is then removed to obtain the residual phase. Thereafter, the trace is circular shifted for a second time about its center to remove the effect of the first circular shift. The complex spatial frequency spectrum is reconstructed using the amplitude and phase residual at each frequency.

Figure 8B:
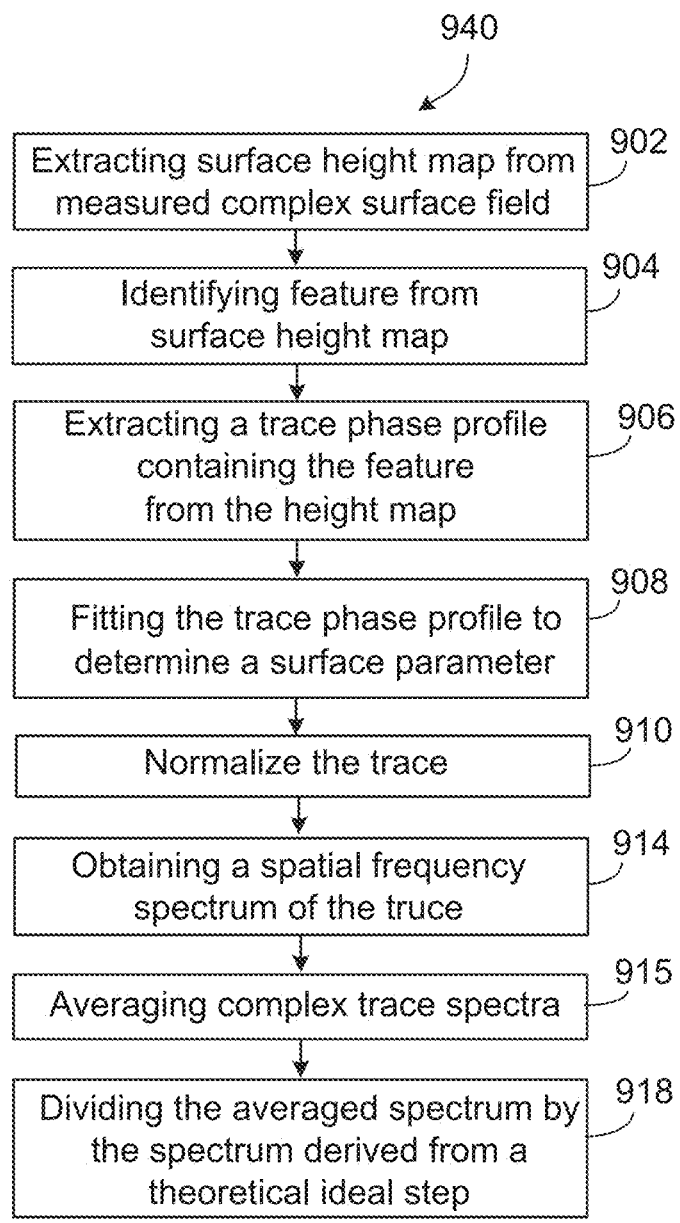
FIG. 8B is a flow chart of another method for determining an ITF.

The sequence outlined above is simply one possible sequence. Other sequences, such as the sequence shown in FIG. 8B can also be used as long as the outcome is a phase detrended spectrum of the step. Phase detrending refers to the removal of phase slopes.

The complex trace spectra for all the traces are averaged to yield the ITF (assuming the artifact step is ideal) at a particular surface in a step 916. An ideal step can have a step edge that has an infinite slope with no overshoot and the surface on either side of the edge can be flat and smooth. Averaging the complex spectra also tends to reduce stochastic noise.

Figure 9:
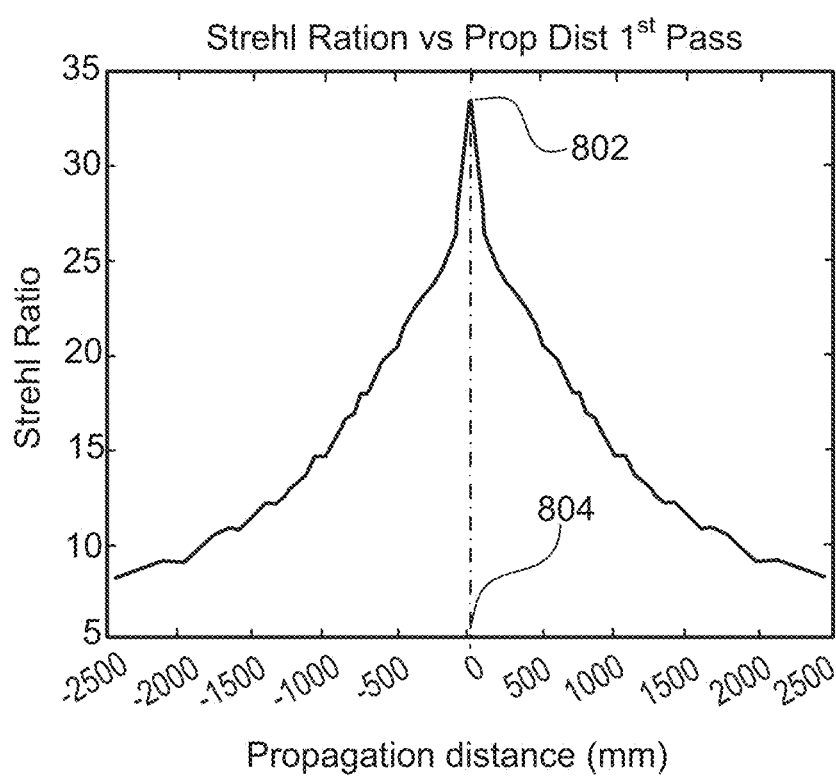
FIG. 9 is a plot of Strehl ratio as a function of propagation distance of a complex surface field.

An example of a focus metric is a parameter that tracks the average frequency content of traces obtained at various surfaces along an optical axis (e.g., z-axis in FIG. 1) after the measured complex surface field is Fresnel propagated to each of those surfaces. When the spectral components for the averaged spectrum is summed, the result is the Strehl ratio, which can serve as the focus metric. For example, FIG. 9 shows the focus metric of traces which have passed quality checks outlined above, plotted against distance along the optical axis for a measured complex field which is nominally in focus. In FIG. 9, the focus metric is the Strehl ratio, and the plot shows a very sharp, symmetric peak 802 near zero propagation distance. The distance (804, in FIG. 8A) at which the highest focus metric is obtained is selected as the propagation length that defines the best focus. Other examples of focus metric can include a merit function that is based in real space rather than Fourier space. The value of the step fit merit function can be used as a focus metric. Best focus was taken to occur when the sum of the squares of the fit residuals is at a minimum.

Figure 10:
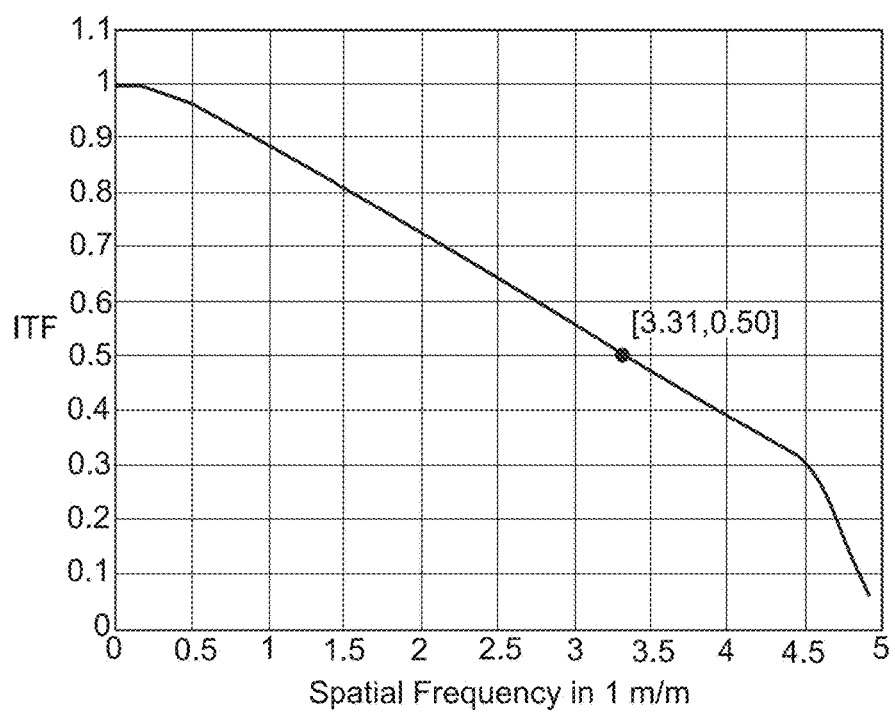
FIG. 10 is a plot of ITF as a function of spatial frequency.

The measured surface field is then propagated to another z position, and the procedure described in the section Determining the ITF and/or a focus metric is repeated to determine a z position where the focus metric is maximized. After the "best focus" position (e.g., 804 in FIG. 9) is determined, the measured complex surface field is Fresnel propagated to that position, and a surface profile or height map is derived for the complex surface field propagated to that position. Selected surface features are identified from the height map and data traces that cross those selected features are extracted from the height map. A spatial frequency spectrum is extracted from each of the data traces and they are complex averaged to obtain an average spatial frequency spectrum. The average spectrum is then divided by the known step edge spectrum to obtain the ITF, or divided by step heights obtaining by fitting the trace data, as shown in FIG. 6. An ITF is shown in FIG. 10 as a function of spatial frequency. The smooth approach of the ITF to a value of one at zero frequency indicates that the DC term (the height normalization) is handled well.

This procedure outlined above does not require that the step height to be known a priori as the step height is measured in each trace.

Figures 11A, 11B, 11C, 11D, 11E:
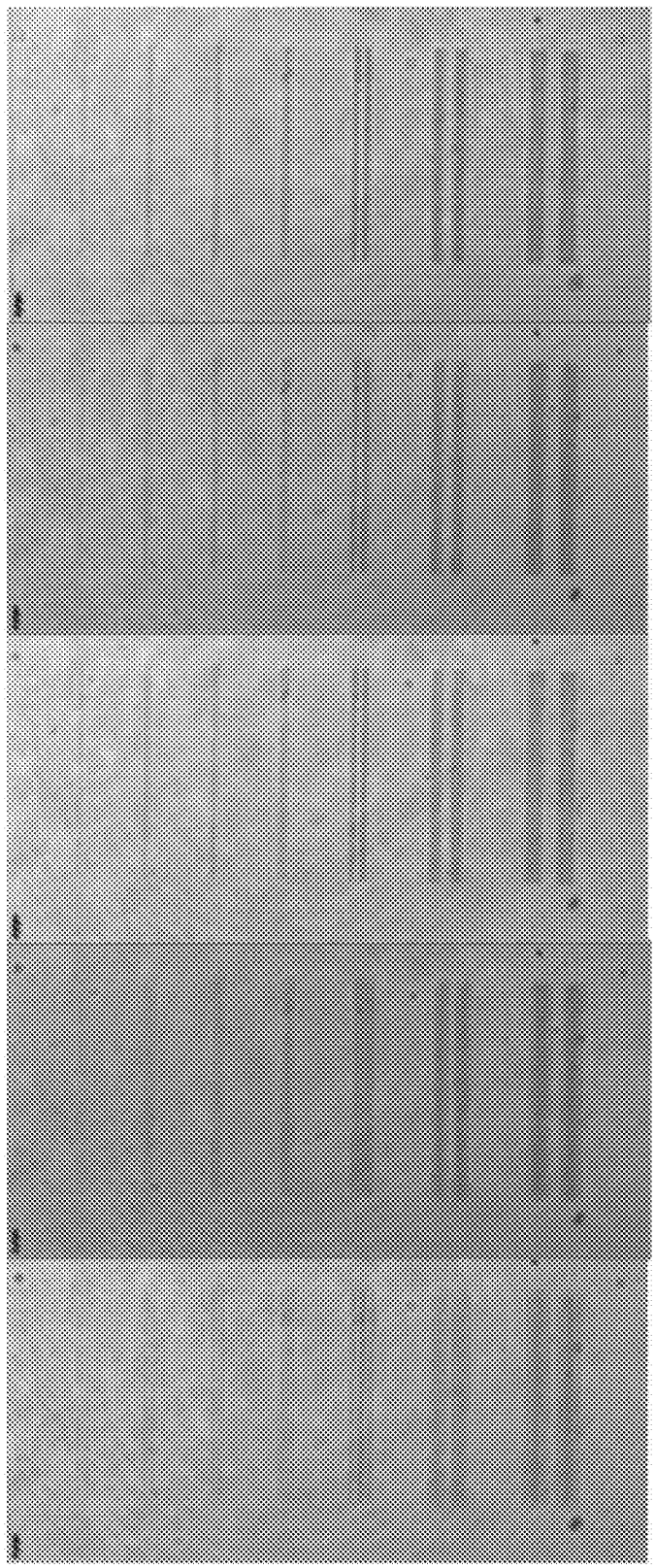
FIG. 11A is a calculated image of a portion of the exemplary artifact.
FIG. 11B is a calculated image of a portion of the exemplary artifact.
FIG. 11C is a calculated image of a portion of the exemplary artifact.
FIG. 11D is a calculated image of a portion of the exemplary artifact.
FIG. 11E is a calculated image of a portion of the exemplary artifact.

FIG. 11A-11E show calculated intensity images of a region of focus features while stepping through focus. There is about 80 mm displacement increments between consecutive figures. FIG. 11C corresponds to best focus as determined by the focus metric and the lines are visually sharpest there. On either side of focus, the lines are blurry or bifurcated as shown in FIGS. 11A, 11B, 11D and 11E.

The ITF can be a reliable way of benchmarking the performance of an IUT. The ITF may be measured once by the manufacturer of the IUT to ensure that the instrument conforms with specifications before the instrument is delivered to a customer. The ITF may be measured by the customer, upon delivery of the instrument to the customer, before the customer accepts the instrument. The customer can then also periodically measure the ITF of the instrument to track the performance of the system and monitor any degradation in the performance of the instrument over time.

An artifact having steps of different heights can be used with instruments operating at different wavelengths. In general, the tolerance for actual step heights is relatively broad as long as the step heights are not too large (≤5% of the wavelength of light) and not too small (greater than ~5 nm). Step heights less than or equal to 5% of the wavelength can assure that the optical transfer is linear (i.e. the instrument measures all the spectral components of the surface with equal fidelity) and heights greater than 5 nm can improve measurement S/N, since the instrument vertical height resolution is finite. For the short wavelength range (about 400 nm or less), nonlinearity in the measurement grows as the step height increases. For the long wavelength range (at or greater than 3-5 microns), the step heights can become comparable to various noise on the surface, and reducing the reliability of the measurement. These tolerances are not hard stops; the performance may slowly degrade as they are exceeded. Within these ranges, the instrument can reliably measure the actual step so the required normalizations can occur. A numerical range that can work well for the instruments that operate at HeNe wavelength of 633 nm, includes step heights that range from 10 nm to 45 nm.

The features of the data processing element can be implemented in digital electronic circuitry, or in computer hardware, firmware, or in combinations of these. The features can be implemented in a computer program product tangibly embodied in an information carrier, e.g., in a machine-readable storage device, for execution by a programmable processor; and features can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program includes a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors one of multiple processors of any kind of computer. Generally, a processor will receive instructions and data from a read-only memory or a random access memory or both. Computers include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display) monitor, e-Ink display or another type of display for displaying information to the user and a keyboard and a pointing device such as a mouse or a trackball by which the user can provide input to the computer.

While this specification contains many specific implementation details, these should not be construed as limitations on the scope of any inventions or of what may be claimed, but rather as descriptions of features specific to particular embodiments of particular inventions.

Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of embodiments of the invention have been described. Nevertheless, it will be understood that various modifications may be made without departing from the spirit and scope of the invention. Accordingly, other embodiments are within the scope of the following claims.

What is claimed is:

1. A method of determining an instrument transfer function of an apparatus, the method comprising:
using the apparatus to measure a first surface field, at a first surface of the apparatus, of an artifact having one or more surface features with known topography, the first surface field being a complex electromagnetic field;
deriving, using an electronic processor, a first surface profile from the first surface field;
identifying, using the electronic processor, the one or more surface features from the first surface profile;

determining, using the electronic processor, a first focus metric at the first surface based on at least a portion of the first surface profile containing the surface feature;

digitally transforming, using the electronic processor, the first surface field into a second surface field at a second surface of the apparatus, the second surface field being a complex electromagnetic field;

deriving, using the electronic processor, a second surface profile from the second surface field and computing a second focus metric for the second surface profile, the second focus metric having a value different from the first focus metric;

determining, based on at least the first focus metric and the second focus metric, an optimum surface for evaluating the instrument transfer function; and determining, using the electronic processor, the instrument transfer function of the apparatus based on at least a portion of a surface profile obtained at the optimum surface.

2. The method of claim 1, further comprising obtaining a spatial frequency spectrum from a portion of the second surface profile.

3. The method of claim 2, wherein the portion of the second surface profile comprises consecutive pixels of the second surface profile that contain the one or more surface features.

4. The method of claim 2, further comprising normalizing and differentiating the portion of the second surface profile prior to obtaining the spatial frequency spectrum of the portion.

5. The method of claim 4, wherein normalizing the portion of the second surface comprises determining, from each portion of the second surface profile, a step height associated with that portion; and dividing the portion by the step height.

6. The method of claim 1, wherein the first surface profile and the second surface profile comprise a topographical representation of the surface of the artifact.

7. The method of claim 1, wherein the one or more surface features comprises a step, the known topography comprises a known step height of the step, and the surface profile comprises a height map.

8. The method of claim 1, wherein the second surface is selected interactively with input from an operator of the apparatus.

9. The method of claim 1, wherein the second surface is selected automatically, without input from an operator of the apparatus.

10. The method of claim 1, wherein digitally transforming the first surface field to the second surface field comprises digitally propagating the first surface field to the second surface field.

11. The method of claim 10, wherein digitally propagating the first surface field to the second surface field comprises obtaining an angular frequency spectrum from the first surface field, multiplying the angular frequency spectrum with a propagation function that is proportional to a distance between the first surface and the second surface to obtain an updated angular frequency spectrum, and determining the second surface field at the second surface using the updated angular frequency spectrum.

12. The method of claim 1, wherein a plurality of portions of the second surface profile is extracted, a spatial frequency spectrum is determined for each of the plurality of the portions, and spectral components of each of the spatial frequency spectrum is summed.

13. The method of claim 12, wherein the second focus metric maximizes a sum of amplitudes of an averaged spatial frequency spectrum derived from the plurality of the portions.

14. The method of claim 13, wherein the second focus metric comprises a Strehl ratio.

15. The method of claim 1, further comprising measuring the artifact to obtain the first surface profile.

16. The method of claim 1, wherein the artifact comprises a plurality of unique features to aid in determining the second surface of the apparatus.

17. The method of claim 16, wherein the plurality of unique features are disposed at known locations, the plurality of features acting as fiducials.

18. The method of claim 17, further comprising determining a lateral resolution of the apparatus based on the fiducials.

19. The method of claim 18, further comprising laterally calibrating the apparatus by comparing a sampling distance for the fiducials with a known separation of the fiducials.

20. The method of claim 1, wherein identifying the surface feature comprises convolving the surface profile with a first function.

21. The method of claim 20, wherein sub-pixel resolution of the surface feature is obtained by convolving the surface profile with the first function.

22. The method of claim 1, wherein the surface feature has a known spatial frequency content.

23. The method of claim 1, wherein determining the instrument transfer function comprises extracting a frequency content of the surface features and dividing a measured amplitude at various frequencies by a known amplitude at those frequencies.

24. The method of claim 1, wherein phase shifting interferometry is used to measure the surface profile of the artifact.

25. The method of claim 1, wherein the one or more surface features is disposed on a substrate that is nominally a sphere.

26. The method of claim 1, wherein the one or more surface features is disposed on a substrate that is nominally a flat.

27. The method of claim 1, wherein a height of the one or more surface features is less than 5% of a wavelength of light used to measure the surface profile.

28. The method of claim 1, wherein the one or more surface features varies in distance along an illumination propagation direction of the apparatus.

29. The method of claim 1, wherein the surface feature varies in reflectivity perpendicular to an illumination propagation direction of the apparatus.

30. A system, the system comprising:

an apparatus configured to measure a first surface profile of an artifact placed at a first surface of the apparatus, the artifact comprising a surface feature; and a processor configured to determine an instrument transfer function of the apparatus by receiving a first surface field of the artifact measured by the apparatus and deriving a first surface profile from the first surface field, the first surface field being a complex electromagnetic field, wherein the processor is configured to identify the surface feature from the first surface profile;

the processor is configured to determine a first focus metric at the first surface based on at least a portion of the first surface profile containing the surface feature;

the processor is configured to digitally transform the first surface field into a second surface field at a second surface of the apparatus, the second surface field being a complex electromagnetic field;

the processor is configured to derive a second surface profile from the second surface field and compute a second focus metric for the second surface profile, the second focus metric having a different value from the first focus metric;

the processor is configured to determine, based on at least the first focus metric and the second focus metric, an optimum surface for evaluating the instrument transfer function; and the processor is configured to determine the instrument transfer function of the apparatus based on at least a portion of a surface profile obtained at the optimum surface.

31. The system of claim 30, further comprising the artifact.

32. An artifact, the artifact comprising:
surface step features having different step heights; and
one or more regions containing surface features having known spatial frequency content;
wherein at least some of the step features comprise sharp steps that are greater than 5 nm and less than or equal to 5% of a wavelength of light used to characterize an instrument.

33. The artifact of claim 32, wherein the step heights of the step features are less than 5% of a wavelength used to probe the artifact for characterizing the instrument.

34. The artifact of claim 32, further comprising a number of unique features situated at known locations, wherein the unique features are configured to act as fiducials.

35. The artifact of claim 32, wherein the fiducials are configured to determine a lateral resolution of the instrument.

36. The artifact of claim 32, further comprising a focusing features configured to precisely focus the instrument.

37. The artifact of claim 32, wherein the artifact is spherical.

38. The artifact of claim 32, wherein the artifact is planar.

39. The artifact of claim 32, wherein the surface step features vary in distance along an illumination propagation direction.

* * * * *